Jan. 6, 1970  G. PRAST ET AL  3,487,635
DEVICE FOR CONVERTING MECHANICAL ENERGY INTO HEAT ENERGY OR CONVERSELY
Filed April 4, 1967  4 Sheets-Sheet 1

INVENTORS
GIJSBERT PRAST
JOHAN A. RIETDIJK
BY
Frank R. Trifari
AGENT

INVENTORS
GIJSBERT PRAST
JOHAN A. RIETDIJK
BY

*Frank R. ...*
AGENT

INVENTORS
GIJSBERT PRAST
JOHAN A. RIETDIJK
BY
AGENT

United States Patent Office 3,487,635
Patented Jan. 6, 1970

3,487,635
DEVICE FOR CONVERTING MECHANI-
CAL ENERGY INTO HEAT ENERGY OR
CONVERSELY
Gijsbert Prast and Johan Adriaan Reitdijk, Emmasingel,
Eindhoven, Netherlands, assignors, by mesne assign-
ments, to U.S. Philips Corporation, New York, N.Y.,
a corporation of Delaware
Filed Apr. 4, 1967, Ser. No. 628,452
Claims priority, application Netherlands, Apr. 14, 1966,
6604961
Int. Cl. F03g 7/06; F25b 9/00
U.S. Cl. 60—24                                           12 Claims

ABSTRACT OF THE DISCLOSURE

This invention comprises an energy dissipation device in combination with the displacer piston of apparatus such as a hot gas engine for converting mechanical energy into heat energy and vice versa. The device includes fluid means from which either kinetic or heat energy is dissipated, an example being an auxiliary cylinder with a secondary piston therein directly connected to the displacer piston and a fluid within the cylinder for restricting movement of the secondary piston and the displacer piston attached thereto. Accordingly, the stroke and phase of the displacer piston can be varied and controlled.

Known devices for converting mechanical energy into heat energy and vice versa may comprise a variable volume compression space communicating with an expansion space having volume which can be varied by a movable piston or piston-like body. In operation these spaces have relatively different mean temperatures with the connection between the spaces including a regenerator through which a working medium is adapted to flow in alternate directions. At least a portion of the piston's side which is remote from the expansion space, forms the boundary of a space containing a gas under a mean pressure which is substantially equal to the average pressure prevailing in the expansion space.

In a device of the kind set forth the piston capable of varying the volume of the expansion space is not coupled with a driving gear, but is driven by the working medium itself by utilizing the loss of flow of this medium in the regenerator. The stroke of the piston and the phase of its movement with respect to the pressure fluctuations in the expansion space are determined here by the friction between the piston and the co-operating cylinder and by the loss of flow of the medium in the regenerator. In operation these two magnitudes are seldom constant and can be determined accurately only with difficulty, such that the phase and the stroke of the piston may vary in an undesired manner.

The invention has for its object to provide a device of the kind referred to above, in which the stroke and the phase of the piston can be adjusted at will to a given value and be maintained at said value.

The device according to the invention is characterized in that the piston or piston-like body is coupled with an energy-dissipating member which may be adjustable.

The power transferred by the working medium to the piston is then absorbed for the most part in the energy-dissipating member. By varying the adjustment of said member the stroke and the phase of the piston may be varied and be adjusted very accurately to the desired value. The adjustment of the energy-dissipating member will not vary in operation.

In a further, advantageous embodiment the energy-dissipating member is formed by a double-acting piston connected with the piston-like body and adapted to move in a closed, medium-containing cylinder. The two spaces on either side of said piston communicate with each other through a narrow aperture, the passage of which may be variable. By changing the passage both the stroke and the phase of the piston-like body are varied.

In an alternate form of the invention the energy-dissipating member is formed by a variable brake, such as an electro-magnetic brake, a fluid brake, a mechanical brake or a combination thereof. According to another advantageous device embodying the invention the energy-dissipating member is formed by a cooled tube, one end of which is closed and the other end of which is bounded by a piston face connected with the piston, capable of varying the volume of the expansion space. Upon a movement of said piston, body pressure fluctuations will be produced in the tube so that owing to hysteresis in the heat transfer, the medium will give off a greater quantity of heat to the tube wall than it will absorb therefrom, the difference being conducted away through the tube wall to the coolant. The coolant may be formed by the atmospheric air of the device.

In a further advantageous embodiment of the device according to the invention the piston also co-operates with a spring. It is possible to design the spring constant so that upon a change in the energy-dissipating device either the stroke or the phase of the piston is varied. In another embodiment the piston is connected through a transmission with a fly-wheel. The stroke of the body is thus fixed, whereas the phase is continuously variable by a variation of this energy-dissipating member.

A further advantageous device embodying the invention is characterized in that the piston capable of varying the volume of the expansion space forms by at least part of its side remote from the expansion space, the boundary of a space which is divided by a partition into two portions which communicate with each other through a narrow aperture, which may be variable. The volume variations produced upon a movement of the piston result in pressure variations, and in this way a structually simple combination of a "gas spring" and an energy-dissipating member ("gas damper") is obtained.

A further embodiment of the invention comprises two aligned pistons whose distal faces are each capable of varying the volume of an expansion space and whose proximal faces co-operate with an energy-dissipating member. The two expansion spaces communicating with the same compression space, and complete balancing is thus obtained. In a further embodiment of the device set forth each of the pistons form by its side remote from the expansion space the boundaries of a space containing a gaseous medium, said two spaces communicating with each other through a cooled tube of smaller diameter. This tube then serves as the energy-dissipating member.

A further device embodying the invention has the feature that the piston capable of varying the volume of the expansion space is provided on either side with a narrowed portion. The piston and said two portions are surrounded by appropriate cylinders and the two cylinder portions of smaller diameter are closed at their ends. Each of the spaces is controlled by a narrowed piston communicating through a controllable resistance with the space influenced by the surface of the piston-like body with which the narrowed portion concerned is connected, while the spaces on either side of the piston communicate with each other through a regenerator, and one of the spaces on either side of the pistons communicates with a compression space. In this device the space on one side of the piston or on the other side may optionally be varied as an expansion space by adjusting the two resistances.

The invention will be described more fully with reference to the drawing which shows a number of devices for converting mechanical energy into heat energy or conversely by way of example in a schematic views.

Figure 1:
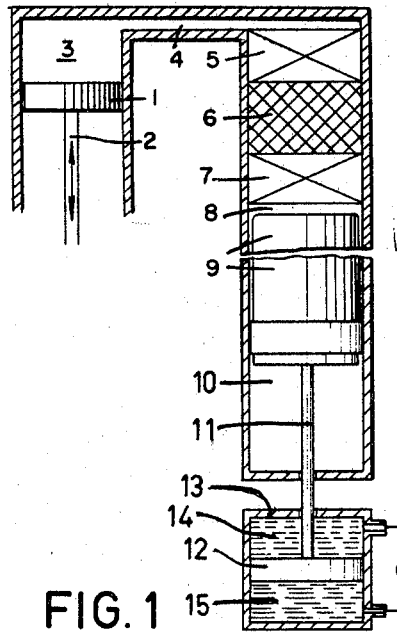
FIG. 1 shows schematically a device for converting mechanical energy into heat energy or conversely, in which the side of the piston remote from the expansion space bounds a space in which prevails the same mean pressure as in the expansion space, the expansion piston being connected with an energy-dissipating member formed by a fluid damper.

Referring to FIG. 1, reference numeral 1 designates a compression piston connected through a piston rod 2 with a driving gear (not shown). The compression piston 1 varies, upon moving, the volume of a compression space 3, which communicates through a duct 4, a cooler 5, a regenerator 6 and a freezer 7 with an expansion space 8. The expansion space 8 is bounded by an expansion piston 9, whose other side bounds a space 10 containing a medium under a pressure equal to the mean pressure in the expansion space 8. The expansion piston 9 is linked to a piston rod 11, having a piston 12, arranged in a closed, liquid-filled cylinder 13. The spaces 14 and 15 on either side of the piston 12 communicate via a duct 16 including a controllable closing member 17 with each other.

Upon a movement of the compression piston 1 pressure variation will be produced in the working space formed by the compression space 3, the expansion space 8 and the intermediate spaces in the duct 4, the cooler 5, the regenerator 6 and the freezer 7. As a result of these pressure variations the expansion piston 9 is also moved and by adjusting the closing member 17 the stroke of the piston and the phase of the piston movement with respect to the pressure variations in the expansion space can be adjusted. The expansion energy transferred by the medium to the expansion piston is dissipated in the closing member 17. The medium of mean pressure in the space 10 ensures that the area of the stroke of the piston 9 does not vary.

By varying the passage of the closing member 17 both the stroke and the phase of the piston 9 can be varied.

Figure 2:
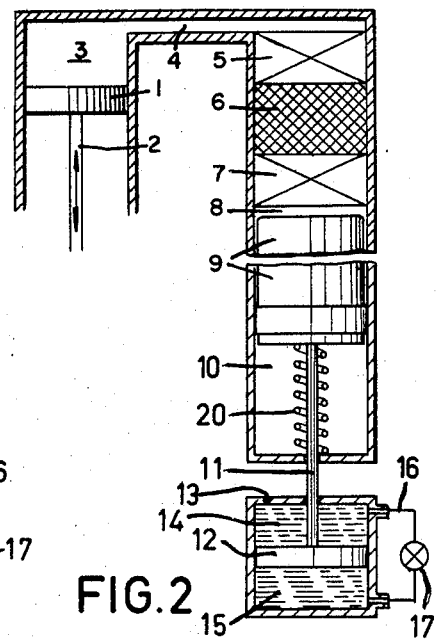
FIGS. 2 to 7 show a number of embodiments of devices for converting mechanical energy into heat energy, in which the expansion piston co-operates with an energy-dissipating member and a spring.

FIG. 2 shows a device for converting mechanical energy into heat energy, which is, for the most part, similar to that of FIG. 1, but in this device the expansion piston 9 co-operates, in addition, with a spring 20. The advantage is that apart from the possibility of control by the closing member 17, a second control-magnitude, that is to say, the spring constant is available for adjusting the phase and/or the stroke of the piston 9.

It is found that with the choice of the spring constant C and of the mass M of the piston so that $C - M\omega^2 = 0$, the volume variations of the expansion space lead by exactly 90° relatively to the pressure variations. $\omega$ is the frequency of the pressure variations. With this choice of C, M and $\omega$ a variation of the position of the closing member 17 results only in a variation of the stroke of the piston 9.

If $C - M\omega^2$ is high, a variation of the position of the closing member 17 does not result any longer in a variation of the stroke of the piston 9 and only the phase of this piston is varied. The phase is then controlled without an increase or decrease in flow losses of the working medium.

Figure 3:
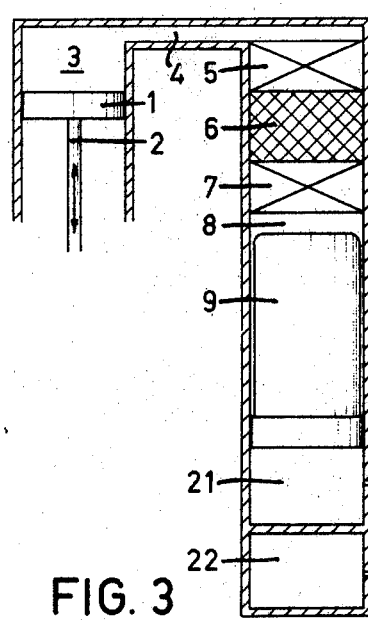

FIG. 3 shows schematically a device corresponding for the most part with the device of the preceding figure. However, the spring and the energy-dissipating member are combined. This is achieved by causing the side of the piston 9 remote from the expansion space to bound a space 21, which communicates through a duct 16 including a variable closing member 17 with a space 22. The spaces 21 and 22 contain a gaseous medium and the space 21 is so large that pressure variations are produced therein by movements of the piston. The mean pressure in the spaces 21 and 22 is substantially equal to the mean pressure prevailing in the working space. When the piston 9 moves down, the pressure in the space 21 increases so that part of the medium flows through the duct 16 and the closing member 17 to the space 22. The expansion energy is thus dissipated in the closing member 17. The next following ascending stroke will cause the medium to flow back by the same path to the space 21. In this way a structurally simple combination of a "gas spring" and a "gas damper" is obtained.

Figure 4:
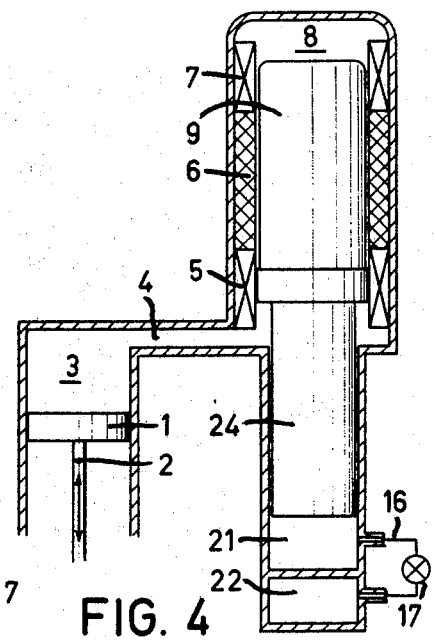

FIG. 4 shows schematically a slightly different embodiment of the device shown in FIG. 3. On the side remote from the expansion space 8 the piston 9 is provided with a piston portion 24 of smaller diameter. During the movement this piston portion 24 varies the volume of a space 21, whose volume is so large that pressure variations are produced. Like in FIG. 3 the space 21 communicates through the duct 16 and the closing member 17 with the space 22, while the spaces 21 and 22 again have a mean pressure equal to the mean pressure of the expansion space. In this device the duct 4 communicates through the cooler 5, surrounding the piston 9, the regenerator 6 and the freezer 7 with the expansion space 8. This device operates otherwise completely like that of FIG. 3.

Figure 5:
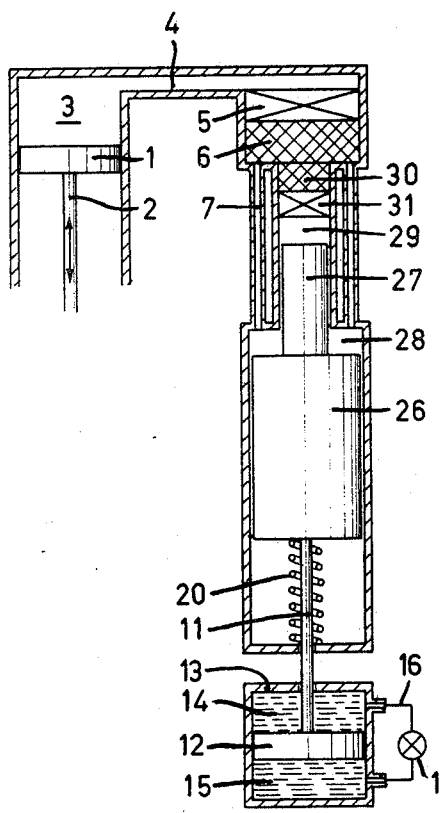
Figure 6:
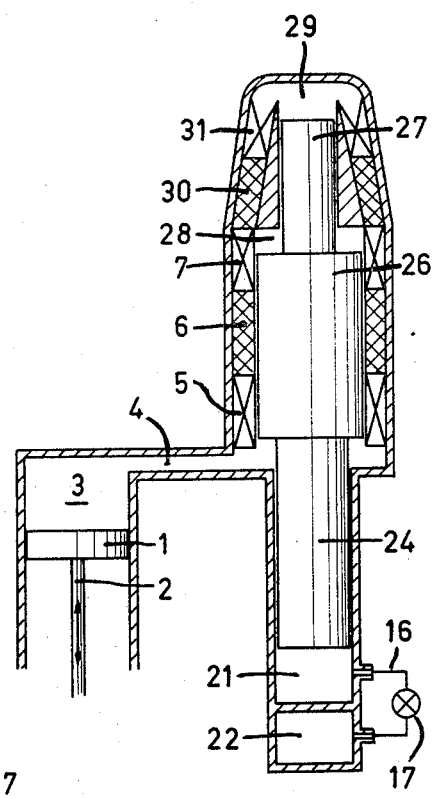

FIGS. 5 and 6 show embodiments of devices for converting mechanical energy into heat energy, in which the expansion piston comprises two portions 26 and 27 of different diameters. This piston, like in the device shown in the preceding figures, co-operates with a spring and an energy-dissipating member. In the device shown in FIG. 5 these are formed by a spring 20 and a fluid damper 12, 13, 14, 15, 17, whereas in the device shown in FIG. 6 these are formed by the combination of the "gas spring" and the "gas damper" 21, 22, 17.

Since the expansion piston comprises two portions of different diameters, two piston faces are available, each of which acts upon the volume of an expansion space 28 and 29 respectively. The compression space 3 communicates through a cooler 5, a first regenerator 6 and a first freezer 7 with the expansion space 28, which communicates through a second regenerator 30 and a second freezer 31 with the expansion space 29. In operation the expansion space 29 will have a lower temperature than the expansion space 28.

Figure 7:
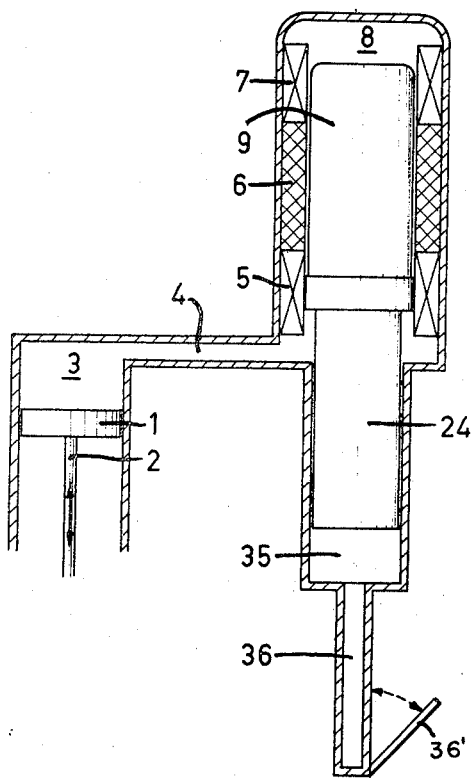

FIG. 7 shows schematically a device for converting mechanical energy into heat energy in which the expansion piston, by its side remote from the expansion space 7, acts upon a space 35. The space 35 is prolonged in a tubular part 36, while the volume of the spaces 35 and 36 is in total so large that pressure variations appear therein upon a movement of the piston. The tubular part 36 then operates as an energy-dissipating member, since upon a rise in pressure more heat is transferred to the tube wall than the wall absorbs upon a drop in pressure. The difference in heat is given off to the ambient atmosphere, which means loss of energy for the system. This energy-dissipating member can be controlled by enlarging or reducing the surface of the tube wall, for example by means of extensible copper rods or vanes 36'. As an alternative, the tubular part may be cooled on the outside by a special cooler, the cooling power of which may be controllable.

Figure 8:
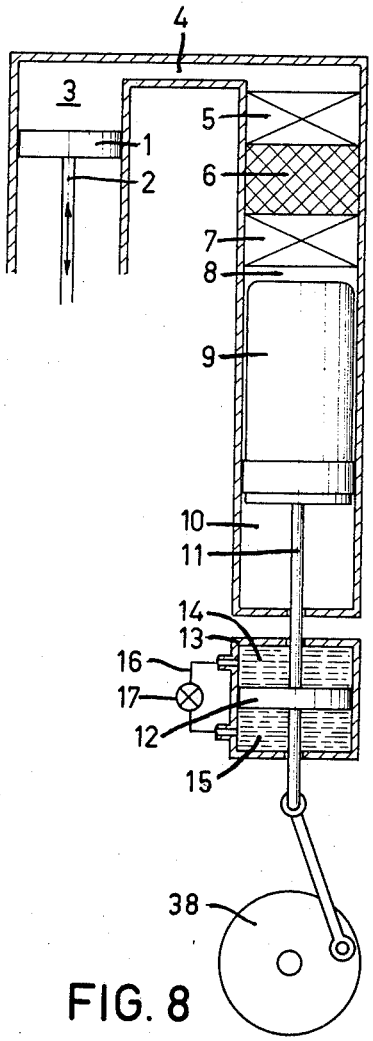
FIG. 8 shows a device for converting mechanical energy into heat energy of conversely in a diagrammatic view, said device comprising two expansion pistons whose distal sides are capable of varying the volume of an expansion space.

FIG. 8 shows a device corresponding again with the devices shown in the preceding figures, in which device the expansion piston 9 is coupled with a fluid damper 12, 13, 14, 15, 16, 17 and a flywheel 38. In the space 10 beneath the piston prevails the mean pressure of the expansion space. The stroke of the expansion piston 9 is thus fixed, whereas by varying the position of the closing member 17 the phase can be varied.

Figures 9, 10:
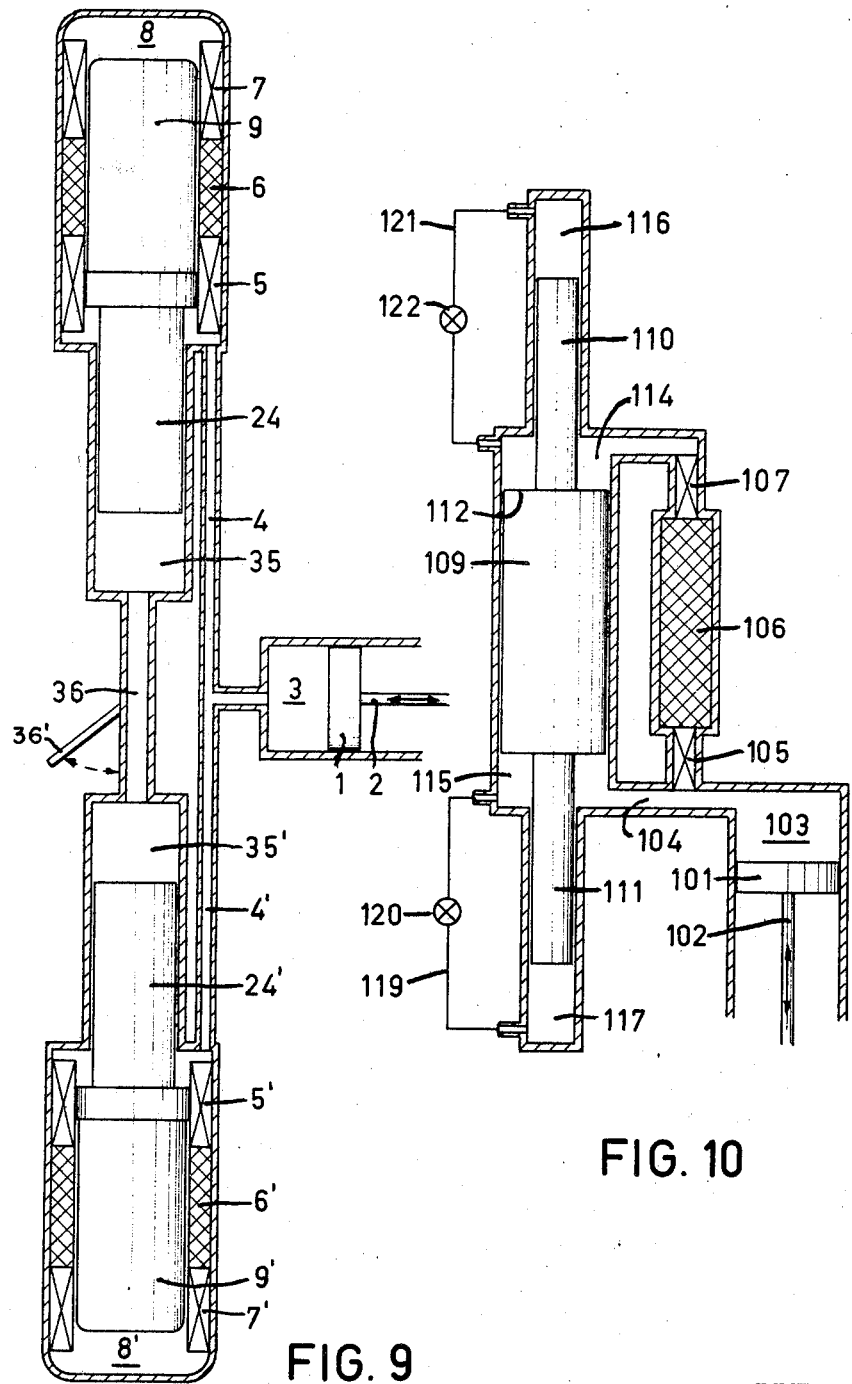
FIG. 9 shows schematically a device for converting mechanical energy into heat energy or conversely, in which the expansion piston co-operates on both sides with an energy-dissipating member, which members are variable.

FIG. 9 shows a device for the conversion of mechanical energy into heat energy or conversely, which comprises one compression space 3 and two expansion spaces 8 and 8', which communicate both through a duct 4 and 4', a cooler 5, 5', a regenerator 6, 6' and a freezer 7, 7' respectively with said compression space. The expansion pistons 9, 9' are aligned and act upon by their distal sides the volume of the relative expansion spaces. By their proximal faces these pistons act upon the volume of a space 35, 35' respectively, in which pressure fluctuations are produced and in which prevails the same mean pressure as in the expansion spaces. The spaces 35 and 35' communicates with each other through a tube 36, which operates as an energy-dissipating member, as is explained with reference to the device of FIG. 7. More specifically, the surface of tube 36 can be enlarged by means of extensible copper vanes 36'. In this way a device is obtained in which at least the expansion portion is completely balanced, which may be extremely important under given conditions.

FIG. 10 shows a device for the conversion of mechanical energy into heat energy or conversely in a diagrammatic view, which comprises an expansion piston 109, the two sides of which have narrowed portions 110 and 111. The annular face 112 and 113, obtained at the transitions between the piston and the narrowed portions, act upon the volumes of the spaces 114 and 115 respectively. The surfaces of the portions 110 and 111 act upon the volumes of the space 116 and 117 respectively. The space 114 communicates with the compression space 103 through a cooler 105, a regenerator 106, a freezer 107. The space 115 communicates through the duct 104 also with the compression space 103. The space 117 communicates through the duct 119 and a controllable closing member 120 included therein with the space 115, whereas the space 116 communicates through the duct 121 and the controllable closing member 122 with the space 114.

If in this device the closing member 122 is completely open, so that no energy dissipation can take place therein and the closing member 120 is in a position in which energy is dissipated, the piston 109 will move with such a phase that the volume variations of the spaces 115 and 116 lead with respect to the pressure variations so that these spaces constitute expansion spaces ($\phi$ pdV positive). The medium in the freezer 107 will withdraw heat from the surrounding, from the object to be cooled, or from the burner.

When the closing member 120 is completely opened, so that no energy is dissipated therein, and the closing member 122 is moved in the energy-dissipating position, the piston 109 will move with such a phase that the volume variation of the space 114 lags with respect to the pressure variation so that this space may be considered as the compression space ($\phi$ pdV negative), so that heat can be given off to the freezer 107 (the system becomes hot). In the case of an engine (a device in which heat energy is converted into mechanical energy) the direction of rotation can be inverted by a control of the closing members 122 and 120.

Although the figures show a compression device 1, 2, 3 this may be replaced by a container having a high-pressure working medium and a container having a low-pressure working medium, both of which communicate through a controllable closing member with the expansion space at the desired instants.

What is claimed is:

1. In an apparatus for converting mechanical energy to heat energy or heat energy to mechanical energy, the apparatus including a housing and means producing cyclic pressure variations in a working medium, the improvement in combination therewith, comprising:
   (a) a first expansion cylinder;
   (b) a first expansion piston (i) having a working surface and a remote end, (ii) being reciprocally movable in the expansion cylinder and defining therewith a first variable-volume, expansion space adjacent the working surface and a first variable-volume remote space adjacent the remote end, and (iii) being a floating member without mechanical connection to said means for producing cyclic pressure, the expansion space being in communication with said means;
   (c) heat regenerator means disposed substantially between the means for producing cyclic pressure and the working surface, the working medium (i) being flowable through the regenerator means between said means for producing cyclic pressure and expansion space, and (ii) being in communication and driving relationship with the working surface of the piston, and
   (d) energy dissipating means including fluid means operatively movable with the expansion piston and valve means controlling movement of the fluid for regulating movement of the expansion piston relative to said cyclic pressure variations.

2. Apparatus as defined in claim 1 wherein said means for producing cyclic pressure variations of the working medium comprises a compression piston reciprocally movable in a compression cylinder.

3. Apparatus as defined in claim 1 wherein said remote space contains a second gaseous medium (i) which has a means pressure substantially equal to the mean pressure of said working medium in the expansion space, and (ii) which is in operative relationship with said expansion piston for effecting primarily the stroke of the movement thereof.

4. Apparatus as defined in claim 3 wherein the energy dissipating means comprises:
   (a) an auxiliary cylinder;
   (b) a double-acting auxiliary piston reciprocally movable in the auxiliary cylinder and defining therewith two variable-volume auxiliary spaces on either side of the piston for containing a fluid, the auxiliary piston including means for drive connection with the expansion piston,
   (c) a conduit for passage of the fluid between said two auxiliary spaces in response to movement of the auxiliary piston, and
   (d) said valve means in the conduit adjustably controlling the fluid flow therethrough, and thereby controlling primarily the phase movement of the expansion piston relative to said cyclic pressure variations.

5. Apparatus as defined in claim 3 further comprising a compression spring disposed in said remote space and operatively engaging the remote end of the expansion piston for regulating movement of said piston.

6. Apparatus as defined in claim 3 wherein the fluid of said dissipating means is liquid.

7. Apparatus as defined in claim 3 further comprising (a) a partition in said remote space thereby defining two chambers, (b) a conduit interconnecting said chambers, and (c) said valve means regulating the flow of said second medium between said chambers thereby dissipating energy and controlling movement of the expansion piston.

8. Apparatus as defined in claim 3 wherein the expansion piston comprises a first part operatively communicating with medium flowed through the regenerator, and a second part having a smaller outer diameter and extending in end-to-end relationship from the first part into a portion of said remote space, the second part varying the volume of the remote space with corresponding pressure variations therein.

9. Apparatus as defined in claim 3 wherein (a) the expansion piston comprises a central part having two ends and two smaller-diameter parts extending generally coaxially from each end, a portion of each end defining a working surface with a variable space being defined between each working surface and an adjacent part of the expansion cylinder, and remote spaces defined adjacent the remote ends of the smaller-diameter parts, (b) the apparatus includes first conduit means communicating between the means for producing cyclic pressure and one of said variable spaces, second conduit means interconnecting each variable space and one remote space, and said valve means regulating the fluid flow through each of said second conduit means, (c) the regenerator means communicates between said two variable spaces, and (d) selectively one valve means is fully opened and non-dissipating of energy while the other is partially closed and energy-dissipating, whereby one variable space functions as a gas compression space and the other as a gas expansion, such that the apparatus operates either to produce or absorb heat energy.

10. Apparatus as defined in claim 3 wherein said energy dissipating means comprises a rotatable wheel and a crank means connected to the auxiliary piston.

11. Apparatus as defined in claim 3 further comprising a second expansion cylinder and expansion piston similar to the first and having similar expansion and remote spaces, the two remote spaces of the two cylinders communicating with the same energy dissipation means, and the two expansion spaces communicating with the same cyclic pressure means.

12. In an apparatus for converting mechanical energy to heat energy or heat energy to mechanical energy, the apparatus including a housing and means producing cyclic pressure variations in a working medium, the improvement in combination therewith comprising:
  (a) a first expansion cylinder;
  (b) a first expansion piston (i) having a working surface and a remote end, (ii) being reciprocally movable in the expansion cylinder and defining therewith a first variable-volume expansion space adjacent the working surface and a first variable-volume remote space adjacent the remote end, and (iii) being a floating member without mechanical connection to said means for producing cyclic pressure, the expansion space being in communication with said means;
  (c) heat regenerator means disposed substantially between the means for producing cyclic pressure and the working surface, the working medium (i) being flowable through the regenerator means between said means for producing cyclic pressure and expansion space, and (ii) being in communication and driving relationship with the working surface of the piston, and
  (d) energy dissipating means comprising a collable tube, the tube having (i) a closed end, and (ii) an open end adjoining and in communication with said remote space, the medium in the remote space being heatable when it is compressed by movement of the expansion piston, and some heat of the medium being absorbable by the tube and dissipatable from the tube's outer surface to the atmosphere, said tube having extendible parts for varying the outer surface thereof and accordingly varying the heat and energy dissipating capacity.

No references cited.

CARROLL B. DORITY, Jr., Primary Examiner

U.S. Cl. X.R.

62—6